United States Patent [19]

Kawai

[11] Patent Number: 4,680,182

[45] Date of Patent: Jul. 14, 1987

[54] BAKER'S DOUGH

[76] Inventor: Masanobu Kawai, 3-25-15, Moridai, Atsugi-Shi, Kanagawa-ken, Japan

[21] Appl. No.: 603,479

[22] Filed: Apr. 24, 1984

[30] Foreign Application Priority Data

May 2, 1983 [JP] Japan ................................. 58-78033

[51] Int. Cl.$^4$ ..................... A21D 10/00; A21D 8/04
[52] U.S. Cl. ....................................... 426/62; 426/18; 426/20; 426/27
[58] Field of Search ............. 435/255, 256, 940, 942, 435/172.1; 426/19, 27, 62, 18, 20

[56] References Cited

U.S. PATENT DOCUMENTS 3,394,008  7/1968  Lodder et al. ................... 435/172.1
3,802,998  4/1974  Tsyganov et al. ................... 435/940
4,547,374  10/1985  Nakatomi et al. ................... 435/256

OTHER PUBLICATIONS

Chemical Abstracts: 91:120142y, Levchenko et al., Genetika, (1979), 15(6), 1007–14.

*Primary Examiner*—Esther M. Kepplinger

[57] ABSTRACT

The present invention relates to a dough which includes a yeast of the genus Saccharomyces resistant to polyene antibiotics. These yeasts have been found to be particularly useful in the preparation of doughs which are frozen and subsequently defrosted for use. The doughs according to the invention when used after freezing and defrosting provide comestible products of a higher quality than previously known for such products.

2 Claims, No Drawings

BAKER'S DOUGH

The present invention relates to a baker's dough. More particularly, the present invention provides a baker's dough which comprises a yeast of the genus Saccharomyces which is resistant to polyene antibiotics and a process for the production of such a dough. The yeast in the doughs according to the invention exhibit an improved stability to freezing and thus show a high fermentation power after freezing, storage and defrosting.

Nowadays, commercially available frozen doughs for baker's products are, in general, produced by the steps of mixing the ingredients, fermenting for a convenient period of time, optionally moulding the dough mix and freezing the moulded article to obtain a frozen dough which is then defrosted, optionally re-moulded and proofed. The dough is finally baked or fried to obtain the comestible product.

The use of frozen doughs for the preparation of baker's products is on the increase. These products have certain advantages such as, for example, the introduction of simpler operations for the preparation of baker's products, the feasibility of producing many kinds of baker's products in limited batches for each product on or adjacent to retail premises and thus the possibility of supplying consumers with freshly baked products.

Conventional frozen baker's doughs have certain disadvantages, among which the problem of the sensitivity of the yeast to freezing is the most important. Various attempts have hitherto been made to solve this problem. For example, it has been proposed to use a rich dough containing larger amounts of sugar, oil, fat, egg and milk products. In such a case, the fermentation time is shorter than that for conventional doughs and the quality of the comestibles thus prepared is not always satisfactory. Also, it has hitherto been difficult to obtain frozen dough suitable for the preparation of highly leavened bakers products such as, for example, white bread and French bread. There is therefore a need for an improved yeast which when incorporated into baker's dough can be satisfactorily frozen and moreover which may be used for such a purpose without the need to change the amounts of other components of the dough or the process steps which have conventionally been used.

It was previously known, for example, to use *Saccharomyces rosei* instead of conventional yeasts of *S. cerevisiae* [Japanese Published Unexamined Patent Application No. 144,036/81] and to use yeasts of the genus Saccharomyces which show a high resistance to alcohol [Japanese Patent Application 172,439/81] for this purpose. However, there is still a need for further improvements as the quality of the products obtained by such methods is still not always satisfactory.

The present invention is based upon the discovery that the quality of bread and other baker's products may be improved by the use of yeasts of the genus Saccharomyces which are characterized by their resistance to polyene antibiotics.

According to one feature of the present invention, there is thus provided a baker's dough which includes a yeast of the genus Saccharomyces which is characterized by its resistance to polyene antibiotics.

According to a further feature of the present invention there is provided a process for the preparation of dough according to the invention as hereinbefore defined wherein a mixture of wheat flour, water and a yeast of the genus Saccharomyces which is resistant to polyene antibiotics are kneaded together.

According to a still further feature of the present invention, there are provided bread and other comestibles produced from a baker's dough according to the invention as hereinbefore defined which has been frozen and defrosted.

The yeasts of the genus Saccharomyces which are resistant to polyene antibiotics and which are suitable for use in baker's dough according to the present invention are exemplified by *S. uvarum* TS-1-98 (FERM-BP No. 472), *S. chevalieri* A-080-8 (FERM-BP No. 471), *S. chevalieri* A-080-70 (FERM-BP No. 474) and *S. cerevisiae* A-090-6 (FERM-BP No. 473).

The term "polyene antibiotics" used herein includes nystatin, amphotericin B and filipin.

The above-mentioned microorganisms were deposited with the Fermentation Research Institute Agency of Industrial Science and Technology, Ministry of Trade and Industry of 1 -3, Higashi 1-chome, Yatabe-machi Tsukuba-gun, Ibaraki-ken 305, Japan under the Budapest Treaty on the following dates.

| Organism | Date |
|---|---|
| FERM-BP No. 471 | 25. 04. 1983 |
| FERM-BP No. 472 | 25. 04. 1983 |
| FERM-BP No. 473 | 25. 04. 1983 |
| FERM-BP No. 474 | 25. 04. 1983 |

The mutant yeast useful in carrying out the present invention can be obtained by conventional means such as ultraviolet ray irradiation, X-ray irradiation, radioactive ray irradiation and a treatment with chemical mutagens. A specific example of the mutation was carried out in the following manner.

A parent yeast was cultured at 30° C. for 24 hours with shaking in medium containing glucose (5%), yeast extract (0.5%), polypeptone (1%), potassium phosphate (monobasic) (0.5%) and magnesium sulfate (0.2%). After completion of culturing, the yeast cells were separated from the cultured broth by centrifugation. The separated cells were washed and suspended in a 0.2M phosphate buffered solution having a pH of 8 (10 ml) and containing ethylmethane sulfonate (0.3 ml) and 40% glucose (0.5 ml) at a concentration of about $10^8$ cells/ml and were kept at 3° C. for 90 minutes. The reaction solution (0.2 ml) was added to a 6% sodium thiosulfate solution (9.8 ml) for neutralization for 10 minutes. The neutralized solution (0.1 ml) was added to a similar medium (2 ml) for culturing at 30° C. for 24 hours. The cultured broth was suitably diluted, and 0.1 ml was then smeared on to a similar medium containing 120 mg/l of nystatin for culturing at 30° C. for 14 hours. Grown colonies on the nystatin-containing medium were recognized as qualified colonies for the purpose of the present invention.

The growth of the different types of yeast on a nystatin containing medium is shown in Table 1.

TABLE 1

| Yeast | Concentration of nystatin | | | | | |
|---|---|---|---|---|---|---|
| | 0 | 50 | 80 | 100 | 120 | 150 (mg/l) |
| *S. cervisiae* | | | | | | |
| Baker's yeast* | +3 | 0 | 0 | 0 | 0 | 0 |
| A-090-6 | +3 | +1 | +1 | ± | ± | 0 |
| *S. chevalieri* | | | | | | |

TABLE 1-continued

| Yeast | Concentration of nystatin | | | | | |
|---|---|---|---|---|---|---|
| | 0 | 50 | 80 | 100 | 120 | 150 (mg/l) |
| A-080-8 | +3 | +2 | +1 | ± | ± | ± |
| A-080-70 | +3 | +2 | +1 | ± | ± | ± |
| S. uvarum TS-1-98 | +3 | +3 | +1 | ± | ± | ± |

*commercial product of Kyowa Hakko Kogyo K.K., Diayeast
[+3, +2, +1, ± and 0 indicate the growth in a medium containing nystatin (120 mg/l)]

The yeasts of the present invention may be cultured in a conventional manner by using either synthetic or organic media which contain suitable amounts of assimilable sources of carbon, nitrogen, inorganic salts and the various other substances required for the growth of yeasts. Feeding culture of molasses used for culturing usual baker's yeasts is preferably adopted.

The fermentation power of the yeast used in accordance with the present invention after defrosting was measured in the following manner.

The yeasts shown in Table 2 were suspended in a fermentation liquor as hereinafter defined at a concentration of 10% (w/v) calculated as pressed yeast containing 67% water. 2.5 ml of the cell suspension was mixed with 7.5 ml of the fermentation liquor and the mixture was shaken at a temperature of 30° C. In this manner, the volume (designated as "a" ml) of the carbon dioxide generated in 90 minutes was measured by displacement of a saturated sodium chloride solution. Separately, a part of the cell suspension was frozen and kept at −20° C. for 6 days without any pre-treatment and then defrosted at 30° C. for 30 minutes. The defrosted cell suspension was treated in a similar manner to that described above to measure the corresponding amount of gas which was designated as "b" ml. The remaining fermentation power of the yeast was expressed by (b/a×100)%. The results are shown in Table 2. The above-mentioned fermentation liquor used was a Schltz's medium containing 0.05M citric acid buffer solution (pH=5.5), sugar (9.2%) and sodium chloride (3.46%).

A yeast having a remaining fermentation power of more than 40% is recognized as a yeast with acceptable stability of freezing:

TABLE 2

| Yeast | Remaining fermentation power (%) |
|---|---|
| Saccharomyces uvarum TS-1-98 | 93.8 |
| S. chevalieri A-080-8 | 105.6 |
| S. chevalieri A-080-70 | 100.0 |
| S. cerevisiae A-090-6 | 85.3 |
| Control (S. cerevisiae)* | 10.2 |

*Note:
Diayeast (commercial product of Kyowa Hakko Kogyo K.K., Tokyo) was used as a control yeast in this Table and those following.

From this table, it is apparent that the yeasts of the present invention exhibit a significantly greater stability to freezing than does the commercial grade baker's yeast used as the control.

The doughs of the present invention may be used for the preparation of various lean leavened products such as, for example, white bread, French bread and raisin bread and moreover may be used as an expanding agent for the preparation of comestibles such as Chinese-style bread and doughnuts.

The dough for the preparation of white bread may be prepared by the steps of mixing the ingredients→sponge fermentation→main mixing→rising time→dividing-→rounding→main fermentation→moulding→freezing.

In such a case, the ingredients include, for example, wheat flour, sugar, table salt, shortening, oil, yeast food, yeast and water. The yeasts in accordance with the present invention may be used in an amount of 1–4% by weight of the wheat flour.

The doughs of the present invention may be used to prepare baker's products having superior appearance, inner structure and flavour to the products prepared by using frozen doughs containing conventional yeasts.

The following non-limiting Examples illustrate the invention.

EXAMPLE 1

Pressed yeast cells of Saccharomyces cerevisiae A-90-6, S. chevalieri A-080-8 and A-080-70 and S. uvarum TS-1-98 were respectively used to investigate the remaining fermentation power (resistance or stability to freezing) of frozen doughs for use in the preparation of bread. As a control yeast, the baker's yeast as hereinbefore defined was used.

Table 3 indicates the composition of the test dough. The ingredients were mixed (L: 6 min., H: 1 min.) together at room temperature to prepare a dough which was fermented at 30° C. for 2 hours. After removal of the generated gas, the dough was divided into two parts. The first sample (without freezing) and the second sample (frozen and preserved at −20° C. for 8 days, followed by defrosting at 30° C.) were kept at a temperature of 30° C. for 2 hours to measure the volume of the generated gas by displacement of a saturated sodium chloride solution. The gas volumes from the first and second samples were respectively designated as "a" and "b" ml, and results are shown in Table 4.

TABLE 3

| Composition of dough: | |
|---|---|
| Wheat flour (strong) | 200 g |
| Sugar | 10 g |
| Table salt | 4 g |
| Yeast | 4 g |

TABLE 4

| Yeast | Remaining fermentation power (%) |
|---|---|
| Saccharomyces cerevisiae | |
| Control | 19.5 |
| A-090-6 | 41.0 |
| S. chevalieri | |
| A-080-8 | 69.2 |
| A-080-70 | 66.0 |
| S. uvarum | |
| TS-1-98 | 77.9 |

EXAMPLE 2

Using the dough of Table 5, the quick method as indicated in Table 6 was carried out to prepare frozen doughs for the preparation of white bread by using the pressed cells of Saccharomyces chevalieri A-080-8 and S. uvarum TS-1-98. The control yeast used was as hereinbefore defined in Table 2. In Table 7, a bread as indicated above was prepared by baking a dough which had been prepared at room temperature without freezing, while another bread was prepared by the use of a frozen dough (frozen at −20° C. and defrosted).

TABLE 5

| Composition of dough: | | |
|---|---|---|
| Wheat flour | 550 g | 100% |
| Sugar | 27.5 g | 5% |
| Table salt | 11 g | 2% |
| Shortening | 27.5 g | 5% |
| Yeast food | 0.55 g | 0.1% |
| Yeast | 11 g | 2% |
| Water | 341 g | 62% |

TABLE 6

| Process steps | |
|---|---|
| Mixing (min.) | L: 3, M: 6, H: 5 |
| Mixing temperature | 30° C. |
| Floor (i.e. Rising) time (min.) | 20 |
| Dividing into | 2 |
| Bench time (min.) | 15 |
| Main fermentation | 40° C., RH = 85%, height 3 cm above the edge of the baking form |
| Baking | 210° C. for 23 minutes |

[L—low, M—medium, H—high, RH—relative humidity]

Test methods for moulded doughs:
(1) Without freezing: Main fermentation→baking
(2) With freezing: Freezing (−20° C.)→preserving (−20° C., one month)→defrosting (30° C., 60 min.)-→main fermentation→baking

TABLE 7

| Yeast | Main fermentation (min) | Volume of bread (ml) |
|---|---|---|
| *S. cerevisiae* A-080-8 | | |
| (1) | 66 | 1954 |
| (2) | 105 | 1720 |
| *S. uvarum* TS-1-98 | | |
| (1) | 70 | 1917 |
| (2) | 110 | 1879 |
| Control | | |
| (1) | 55 | 2165 |
| (2) | ≧135** | 1450 |

(1) Not frozen,
(2) Freeze-dried
**As the height did not reach 3 cm above the edge of the mould, the baking was carried out 135 minutes after the start of the main fermentation.

The results obtained from the frozen samples of the present invention were apparently superior to the results obtained from the samples without freezing. The appearance, inner structure and flavour of each bread prepared according to the present invention were similar to those of the control product. The appearance, inner structure and flavour of each product were evaluated by using a test panel consisting of 5 persons. The results obtained by using the frozen doughs of the present invention were good and similar to the results obtained by using the unfrozen control dough.

EXAMPLE 3

Doughs were prepared by the standard method using the sponge mixing method, as shown in Tables 8 and 9.

The preparation of test samples was carried out in a similar manner to that described in Example 2 to obtain the results shown in Table 10, from which it is apparent that in the case where the frozen dough was prepared by the sponge mixing method and preserved over and extended period of time, the frozen dough exhibited a relatively high fermentation power after being defrosted. The results from a functional test indicated that the quality of the bread prepared using the yeast of the present invention was superior to the corresponding quality of the bread using conventional frozen dough.

TABLE 8

| Composition of dough: | Sponge mixing | Main mixing |
|---|---|---|
| Wheat flour (strong) | 700 g (70%) | 300 g (30%) |
| Sugar | — | 50 g (5%) |
| Table salt | — | 20 g (2%) |
| Shortening | — | 50 g (5%) |
| Yeast food | 1 g (0.1%) | — |
| Yeast | 20 g (2%) | — |
| Water | 430 g (43%) | 250 g (25%) |

TABLE 9

| Process steps | Sponge mixing | Main mixing |
|---|---|---|
| Mixing (min.) | L: 3, M: 6, H: 5 | L:5, M:9 |
| Mixing temperature (°C.) | 30 | 30 |
| Sponge fermentation | 240 min. | Floor (rising) time: 20 min. Bench time: 15 min. |
| Dividing into | | 2 |
| Main fermentation | | At 40° C., RH 85%, height 2 cm above the edge of the baking form |
| Baking | | 210° C. for 23 min. |

TABLE 10

| Yeast | Main fermentation (min.) | Volume of bread (ml) |
|---|---|---|
| *S. chevalieri* A-080-8 | | |
| (1) | 70 | 1800 |
| (2) | 110 | 1530 |
| *S. uvarum* TS-1-98 | | |
| (1) | 75 | 1720 |
| (2) | 115 | 1620 |
| Control yeast | | |
| (1) | 60 | 1980 |
| (2) | * | 1050 |

Notes:
(1) Without freezing
(2) With freezing
*As the height of the dough did not reach 2 cm above the form, the sample was baked 120 minutes after the beginning of the main fermentation.

I claim:

1. A baker's dough which comprises wheat flour and a yeast selected from the group consisting of *Saccharomyces uvarum* TS-1-98 (FERM BP 472), *Saccharomyces chevalieri* A-080-8 (FERM BP 471) and *Saccharomyces chevalieri* A-080-70 (FERM BP 474).

2. The dough of claim 1, wherein the yeast is used in an amount of from 1 to 4% by weight of wheat flour present in the dough.

* * * * *